(12) United States Patent
Berland et al.

(10) Patent No.: US 7,840,742 B2
(45) Date of Patent: Nov. 23, 2010

(54) UNIDIRECTIONAL USB INTERFACE CIRCUIT

(75) Inventors: Kerry Berland, Chicago, IL (US); Paul Berland, Elgin, IL (US); Paul Holly, Chicago, IL (US)

(73) Assignee: ES&S AutoMARK, LLC, Omaha, NE (US)

( * ) Notice: Subject to any disclaimer, the term of this patent is extended or adjusted under 35 U.S.C. 154(b) by 85 days.

(21) Appl. No.: 12/168,672

(22) Filed: Jul. 7, 2008

(65) Prior Publication Data

US 2009/0013111 A1    Jan. 8, 2009

Related U.S. Application Data

(60) Provisional application No. 60/958,712, filed on Jul. 6, 2007.

(51) Int. Cl.
*G06F 13/36* (2006.01)

(52) U.S. Cl. ................... 710/315; 710/313; 710/31

(58) Field of Classification Search ......... 710/311–314, 710/104–106, 110, 62–64, 72–73, 31
See application file for complete search history.

(56) References Cited

U.S. PATENT DOCUMENTS

| | | | |
|---|---|---|---|
| 6,710,701 B2 | 3/2004 | Leatherman | |
| 6,973,581 B2 | 12/2005 | Chung | |
| 7,077,314 B2 | 7/2006 | Johnson | |
| 7,080,779 B2 | 7/2006 | Cummings | |
| 7,162,566 B2 * | 1/2007 | Lin | 710/314 |
| 7,344,071 B2 | 3/2008 | Cummings | |
| 7,464,874 B2 | 12/2008 | Donner | |
| 7,523,243 B2 * | 4/2009 | Bohm et al. | 710/305 |
| 7,566,006 B2 | 7/2009 | Cummings | |
| 7,627,708 B2 * | 12/2009 | Bohm et al. | 710/305 |
| 2001/0034640 A1 | 10/2001 | Chaum | |
| 2004/0000587 A1 | 1/2004 | Shibota | |
| 2004/0236890 A1 | 11/2004 | Engler | |
| 2005/0047436 A1 | 3/2005 | Ohata | |
| 2005/0154799 A1 * | 7/2005 | Feng et al. | 710/1 |

(Continued)

OTHER PUBLICATIONS

United States Election Assistance Commission, "2005 Voluntary Voting System Guidelines: vol. I: Version 1.0" [online], Dec. 2005, pp. 1-228, [retrieved on Nov. 7, 2008] Retrieved from the Internet: <URL: http://www.eac.gov/voting%20systems/docs/vvsgvolumei. pdf/attachment_download/file>.

(Continued)

*Primary Examiner*—Raymond N Phan
(74) *Attorney, Agent, or Firm*—Stinson Morrison Hecker LLP

(57) ABSTRACT

A circuit interfaced between a first USB host and a second USB host for providing unidirectional transmission of data signals from the first USB host to the second USB host is provided. A first converter circuit is operable to receive data signals from the first USB host and convert them from a USB protocol to a second communications protocol. A second converter circuit is operable to receive the converted data signals from the first converter circuit and convert them from the second communications protocol to the USB protocol for transmission to the second USB host. The first and second converter circuits are electrically connected to each other in such a manner as to provide a transmission path from the first USB host to the second USB host and to disable a transmission path from the second USB host to the first USB host.

43 Claims, 3 Drawing Sheets

U.S. PATENT DOCUMENTS

| | | |
|---|---|---|
| 2005/0269406 A1 | 12/2005 | Neff |
| 2006/0059293 A1* | 3/2006 | Wurzburg et al. ............ 710/313 |
| 2006/0265540 A1* | 11/2006 | Mass et al. .................. 710/305 |
| 2007/0162666 A1* | 7/2007 | Ise ............................... 710/62 |
| 2007/0204093 A1* | 8/2007 | Wang .......................... 710/315 |
| 2008/0201501 A1* | 8/2008 | Partani et al. ................. 710/60 |
| 2009/0240852 A1* | 9/2009 | Gou ............................. 710/63 |

OTHER PUBLICATIONS

United States Election Assistance Commission, "2005 Voluntary Voting System Guidelines: vol. II: Version 1.0" [online], Dec. 2005, pp. 1-146, [retrieved on Nov. 7, 2008] Retrieved from the Internet: <URL: http://www.eac.gov/voting%20systems/docs/vvsgvolume_ii.pdf/attachment_download/file>.

United States Election Assistance Commission, "2005 Voluntary Voting System Guidelines: vol. I: Version 1.0" [online], Dec. 2005, [retrieved on Nov. 7, 2008] Retrieved from the Internet: <URL: http://www.eac.gov/voting%20systems/docs/vvsgvolumei.pdf/attachment_download/file>, Section 3.1.6 on p. 52, Section 7.4.1 on pp. 118, Section 7.4.6 on pp. 123-124, and Section C.4 on pp. C-12 and C-13.

United States Election Assistance Commission, "2005 Voluntary Voting System Guidelines: vol. I: Version 1.0" [online], Dec. 2005, [retrieved on Nov. 7, 2008] Retrieved from the Internet: <URL: http://www.eac.gov/voting%20systems/docs/vvsgvolumei.pdf/attachment_download/file>, Section 7.4.6.(3) on p. 124.

Future Technology Devices International Ltd., "FT232R USB UART IC Datasheet Version 2.01", Document No. FT_000053, pp. 1-40, copyright 2008.

Lakeview Research, Jan Axelson, "USB Complete. Second Edition. Everything You Need to Develop Custom USB Peripherals", Entire book, 2001, Madison, WI.

Lakeview Research, Jan Axelson, "USB Complete. Second Edition. Everything You Need to Develop Custom USB Peripherals", pp. 21-38 (Chapter 2); pp. 39-69 (Chapter 3) and pp. 473-496 (Chapter 21), 2001, Madison, WI.

USB 2.0 Specification, USB Implementers Forum, Inc., Retrieved from the Internet: <URL: http://www.usb.org/developers/docs>.

* cited by examiner

UNIDIRECTIONAL USB INTERFACE CIRCUIT

CROSS-REFERENCE TO RELATED APPLICATIONS

This application is based on and claims priority to U.S. Provisional Application Ser. No. 60/958,712, filed on Jul. 6, 2007, which is incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention is directed generally to Universal Serial Bus (USB) ports, and more particularly to a unidirectional USB port that allows the transmission of data signals from a first USB host to a second USB host and prohibits the transmission of data signals from the second USB host to the first USB host.

2. Description of Related Art

A widely used interface for connecting a "host" electronic or computing device to various "slave" peripheral devices (such as printers, modems, mice, keyboards, PDAs, game pads and joysticks, scanners, digital cameras, flash drives, personal media players, etc.) is the Universal Serial Bus (USB) interface. The USB interface is a bidirectional interface that currently supports three data rates—low speed (1.5 Mbits/sec), full speed (12 Mbits/sec), and high speed (480 Mbits/sec). The USB interface uses half-duplex differential signaling to combat the effects of electromagnetic noise on longer lines. Half-duplex differential signaling provides for bidirectional communication between a USB host and a USB slave, but only in one direction at a time. Two USB hosts cannot be directly connected with one another; rather, a USB host can only be connected with a USB slave through a USB interface.

BRIEF SUMMARY OF THE INVENTION

The present invention is directed to a circuit interfaced between a first USB host disposed on a first electronic device and a second USB host disposed on a second electronic device so as to allow communication between the two USB hosts. The circuit is configured to allow the transmission of data signals in only one direction (from the first USB host to the second USB host) and to prohibit the transmission of data signals in the other direction (from the second USB host to the first USB host). As such, files may be downloaded from the first electronic device to the second electronic device, but not vice-versa. In effect, the first USB host and the circuit together form a unidirectional USB port on the first electronic device.

In an exemplary embodiment, the circuit comprises first and second converter circuits electronically connected to the first and second USB hosts, respectively. Each of the converter circuits is operable to convert data signals between a USB protocol and a second communication protocol. Preferably, the second communications protocol is a communications protocol that provides for bidirectional transmission of data signals over at least two physically separated transmission paths, such as RS-232, RS-422, RS-485, I²C, SPI and parallel I/O. As such, the first and second converter circuits may be configured such that one of the physically separated transmission paths is used for the transmission of data signals from the first USB host to the second USB host and the other of the physically separated transmission paths is disabled so as to prevent the transmission of data signals from the second USB host to the first USB host.

The present invention may be used in a variety of different configurations and for a variety of different applications. For example, the first USB host and first and second converter circuits could be disposed on an election machine so as to provide a unidirectional USB port on the election machine, and the second USB host could be disposed on a computing device such as a laptop computer. Upon connecting the USB port of the laptop computer to the unidirectional USB port of the election machine, files may be downloaded from the election machine to the laptop computer. These files may comprise bootloader files, operating system files and/or application files of the election machine that may be compared to the certified files for such election machine (e.g., using the appropriate software loaded on the laptop computer). In accordance with the invention, the laptop computer is not able to transmit files to the election machine and, as such, cannot modify the files or data records residing on the election machine. This system configuration may be used to meet the 2005 Voluntary Voting System Guidelines. Other configurations and applications are of course within the scope of the invention.

DETAILED DESCRIPTION OF AN EXEMPLARY EMBODIMENT OF THE INVENTION

The present invention is directed to a circuit interfaced between a first USB host and a second USB host for providing unidirectional transmission of data signals from the first USB host to the second USB host. While the invention will be described in detail below with reference to an exemplary embodiment, it should be understood that the invention is not limited to the specific system configuration or methodology of this embodiment. In addition, although the exemplary embodiment is described as embodying several different inventive features, one skilled in the art will appreciate that any one of these features could be implemented without the others in accordance with the invention.

Figure 1:
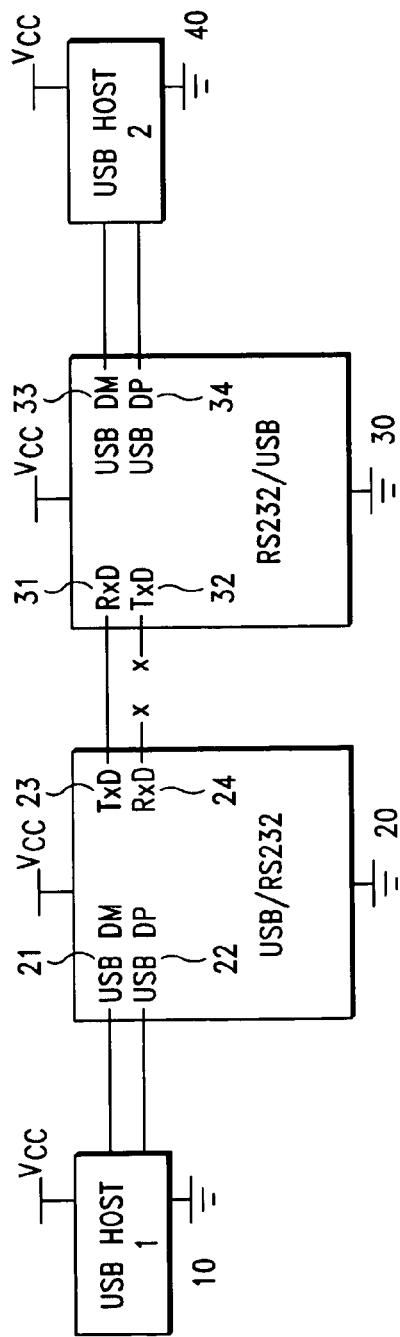
FIG. 1 is a block diagram of a circuit comprised of two converter circuits interfaced between two USB hosts in accordance with an exemplary embodiment of the present invention.

Referring to FIG. 1, a circuit configured in accordance with an exemplary embodiment of the present invention is shown. This circuit comprises two USB hosts 10, 40 in communication with one another through two converter circuits 20, 30. Specifically, the first USB host 10 is electrically connected to the first converter circuit 20, and the second USB host 40 is electrically connected to the second converter circuit 30. As will be described below, the circuit is configured to allow the transmission of data signals in only one direction (from the first USB host 10 to the second USB host 40) and to prohibit the transmission of data signals in the other direction (from the second USB host 40 to the first USB host 10).

In this example, the first and second converter circuits 20, 30 each comprise an FT232R converter chip sold by Future Technology Devices International Ltd. that is operable to convert data signals between a USB protocol and an RS-232 protocol. The first converter circuit 20 includes a USB interface having a USB D-minus (USBDM) terminal 21 and a USB D-plus (USBDP) terminal 22 (i.e., the terminals transmitting and receiving the half-duplex differential signals to and from the first USB host 10). Similarly, the second converter circuit 30 includes a USB interface having a USBDM terminal 33 and a USBDP terminal 34 (i.e., the terminals transmitting and receiving the half-duplex differential signals to and from the second USB host 40).

The first converter circuit 20 also includes a serial universal asynchronous receiver/transmitter (UART) interface having a transmitter (TXD) terminal 23 and a receiver (RXD) terminal 24. Similarly, the second converter circuit 30 includes a serial UART interface having a transmitter (TXD) terminal 31 and a receiver (RXD) terminal 32. As can be seen, the TXD terminal 23 of the first converter circuit 20 is electrically connected to the RXD terminal 31 of the second converter circuit 30 so as to provide a transmission path from the first USB host 10 to the second USB host 40. However, the TXD terminal 31 of the second converter circuit 30 is not connected to the RXD terminal 24 of the first converter circuit 20 so as to disable the transmission path from the second USB host 40 to the first USB host 10.

In operation, the first USB host 10 transmits USB data signals to the first converter circuit 20 for receipt via USBDM and USBDP terminals 21, 22. The first converter circuit 20 converts these USB data signals to RS-232 data signals. The RS-232 data signals are then transmitted from the TXD terminal 23 of the first converter circuit 20 to the RXD terminal 31 of the second converter circuit 30. The second converter circuit 30 converts the RS-232 data signals back into USB data signals. Finally, the second converter circuit 30 transmits the USB data signals to the second USB host 40 via USBDM and USBDP terminals 33, 34.

In the opposite direction, the second USB host 40 would transmit USB data signals to the second converter circuit 30 for receipt via USBDM and USBDP terminals 33, 34. The second converter circuit 30 would then convert these USB data signals to RS-232 data signals. Typically, the RS-232 data signals would then be transmitted from the TXD terminal 32 of the second converter circuit 30 to the RXD terminal 24 of the first converter circuit 20. However, in this circuit, the TXD terminal 32 is not connected to the RXD terminal 24 or any other circuit element. Furthermore, the RXD terminal 24 is not connected to the TXD terminal 32 or any other circuit element. Thus, the transmission line from the second USB host 40 to the first USB host 10 is disabled so as to prevent the transmission of data signals in the opposite direction.

It should be understood that other circuits or converter chips (i.e., other than converter circuits 20, 30) could be utilized in accordance with the present invention. For example, any converter chip could be used that is configured to convert data signals between a USB protocol and a second communications protocol that provides for bidirectional transmission of data signals over at least two physically separated transmission paths. To that end, one of the physically separated transmission paths may be used for the transmission of data signals from the first USB host 10 to the second USB host 40, and the other of the physically separated transmission paths may be disabled so as to prevent the transmission of data signals from the second USB host 40 to the first USB host 10. Examples of such communications protocols include RS-232, RS-422, RS-485, I$^2$C, SPI and parallel input/output (I/O). Of course, one skilled in the art will understand that any circuit that allows the transmission of data signals in one direction and prevents the transmission of data signals in the opposite direction could be used to accomplish the present invention.

Figure 2:
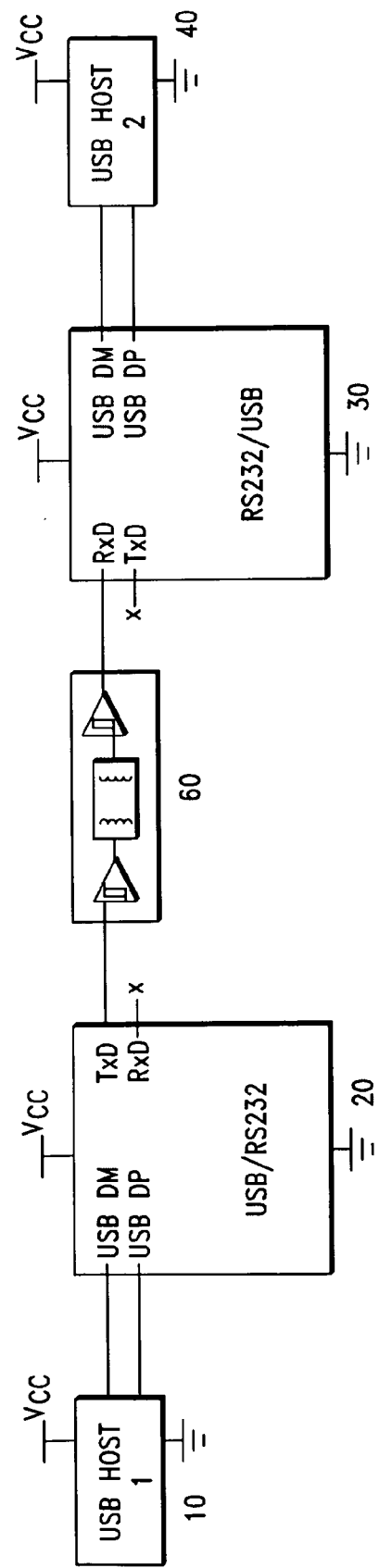
FIG. 2 is a block diagram of the circuit of FIG. 1 with an isolator circuit that isolates the signals transmitted and received by the two USB hosts.

FIG. 2 shows the circuit described above with reference to FIG. 1, but with an additional isolator circuit 60. The isolator circuit 60 is used to prevent damage to components caused by static discharge that is released when coupling between grounded and ungrounded USB hosts 10, 40. The isolator circuit 60 could be implemented using a magnetic interface circuit (e.g., the ADUM1201 digital isolator based on the iCoupler® technology of Analog Devices, Inc.) or an optical coupler device, as is well known in the art.

The circuit of the present invention may be used in a variety of different configurations and for a variety of different applications. A typical purpose of such a circuit is to allow an external computing device (such as a laptop computer) to receive data signals from a high-security computing device (such as an election machine), without any possibility of the external computing device sending data signals to the high-security computing device. As such, files may be securely downloaded from the high-security computing device to the external computing device, but not vice-versa. An example of an election machine that may incorporate the circuit of the present invention is the AutoMARK® voter assist terminal sold by Election Systems and Software, Inc.

Figure 3:
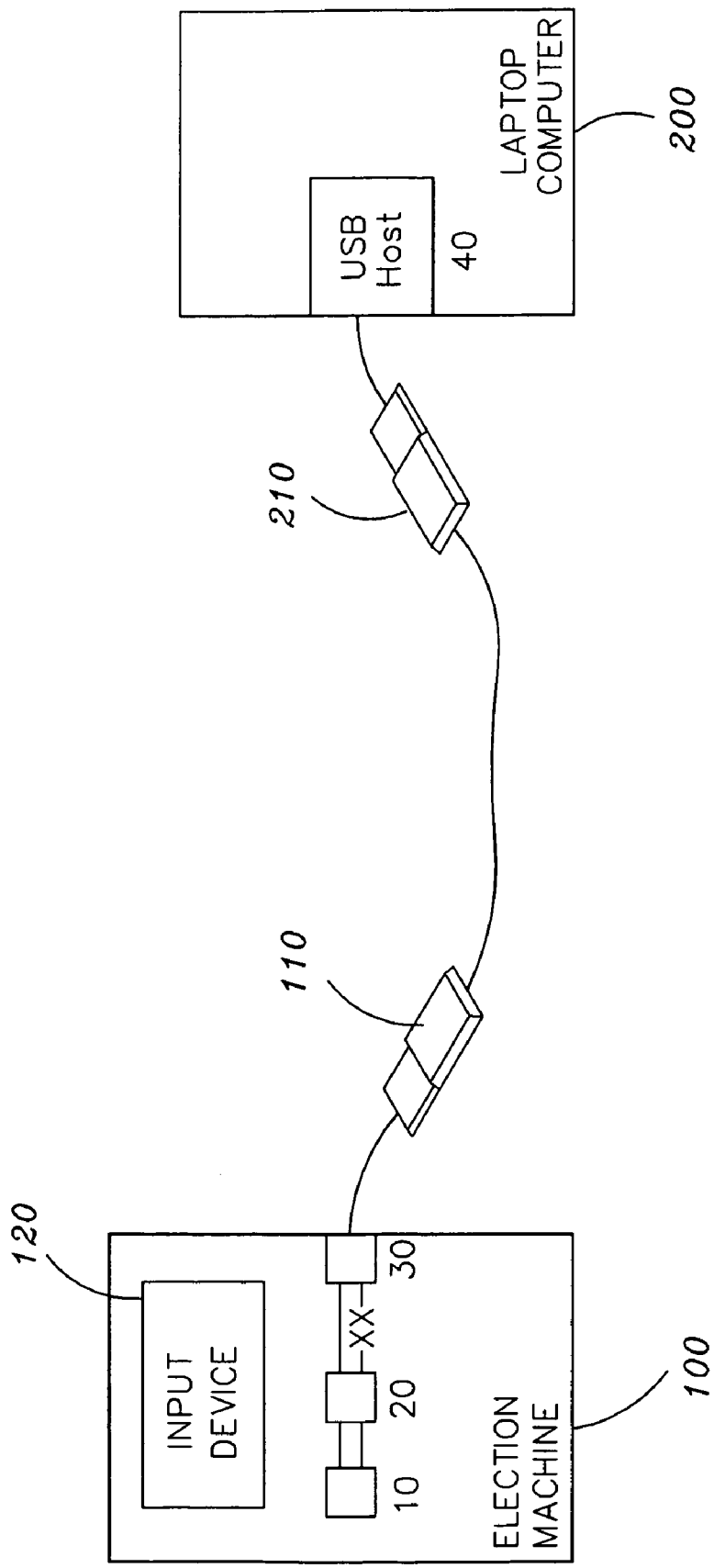
FIG. 3 is a block diagram of an election machine with a unidirectional USB port electrically connected to a USB port of a laptop computer in accordance with the present invention.

For example, referring to FIG. 3 (with reference to the circuit elements of FIG. 1), the first USB host 10 and first and second converter circuits 20, 30 are disposed on an election machine 100, and the second USB host 40 is disposed on a laptop computer 200. In effect, the first USB host 10 and first and second converter circuits 20, 30 together comprise a unidirectional USB port on the election machine 100. Upon connecting the USB port of the laptop computer 200 to the unidirectional USB port of the election machine 100 via USB connectors 110, 210, files may be downloaded from the election machine 100 to the laptop computer 200. However, the laptop computer 200 is not able to transmit files to the election machine 100 and, as such, cannot modify the files or data records residing on the election machine 100.

The files downloaded from the election machine 100 may comprise bootloader files, operating system files and/or application files of the election machine 100. These files may be compared to the certified files for the election machine 100 using the appropriate software loaded on the laptop computer 200. Alternatively, a set of hash files associated with the certified files may be stored on the laptop computer 200, along with an approved hash algorithm (e.g., SHA256). The hash algorithm may then be used to create a set of hashes associated with the downloaded files. The downloaded and certified files could then be compared by comparing the two sets of hash files. Regardless of the manner in which the certified files are compared to the downloaded files, it should be understood that the invention may be used to meet the 2005 Voluntary Voting System Guidelines.

One skilled in the art will understand that the download of files from the election machine 100 to the laptop computer 200 may be initiated in a variety of different ways. In this example, a user enters a download command into an input device 120 (e.g., a touch screen display) of the election machine 100, which causes the download of files to the laptop computer 200. It should be understood that the operating system files may need to be modified to provide the capability of downloading all of the files from the election machine 100 to the laptop computer 200.

Figure 4:
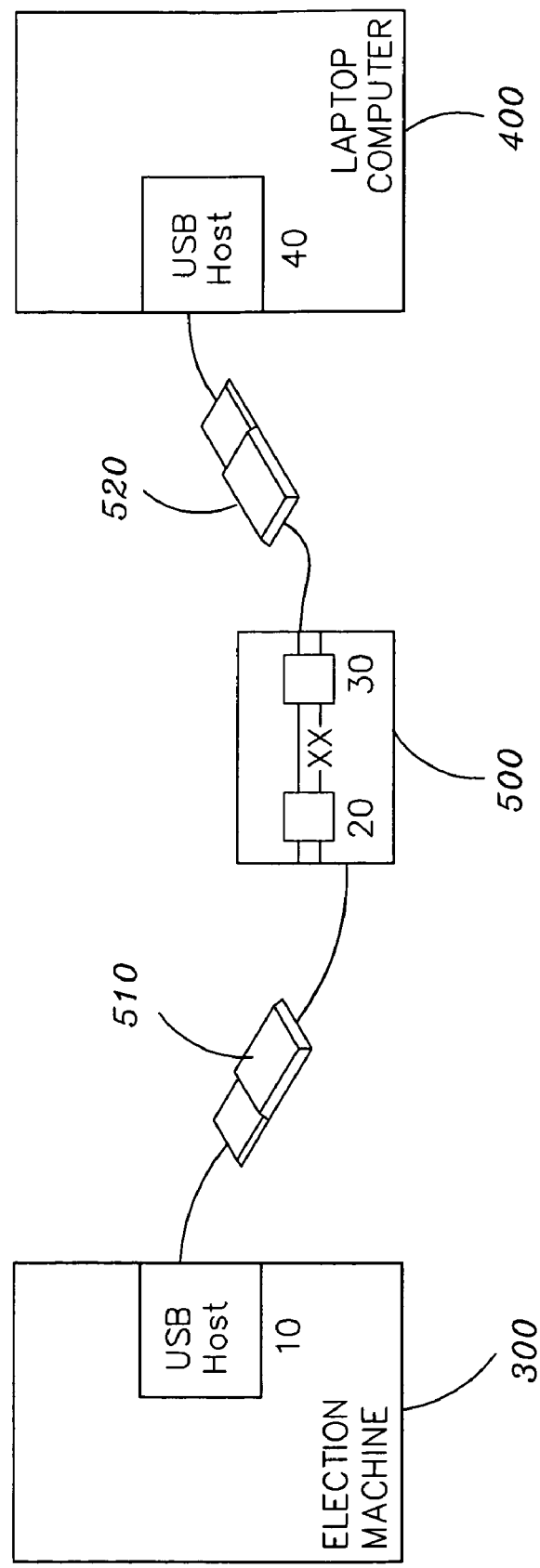
FIG. 4 is a block diagram of a converter module electrically connected to a USB port of an election machine and a USB port of a laptop computer in accordance with the present invention.

Referring to FIG. 4, an alternative configuration is provided in which the first USB host 10 is disposed on an election machine 300, and the second USB host 40 is disposed on a laptop computer 400. The first and second converter circuits 20, 30 are contained within a converter module 500 located external to the election machine 300. The converter module includes a first USB connector 510 that may be detachably connected to the USB port of the election machine 300 and a second USB connector 520 that may be detachably connected to the USB port of the laptop computer 400. Files may then be downloaded from the election machine 300 to the laptop computer 400 through the converter module 500, as described above in connection with FIG. 3. With this configuration, the converter module 500 may be used in connection with any election machine (or other type of computing device) that includes a standard USB port. Of course, other configurations and applications are also within the scope of the present invention.

While the present invention has been described and illustrated hereinabove with reference to an exemplary embodiment, it should be understood that various modifications could be made to this embodiment without departing from the scope of the invention. In addition, it should be understood that the exemplary embodiment embodies different inventive features. One skilled in the art will appreciate that any one of these inventive features could be implemented without the other in accordance with the invention. Therefore, the present invention is not to be limited to the specific configuration or methodology of the exemplary embodiment, except insofar as such limitations are included in the following claims.

The invention claimed is:

1. A circuit interfaced between a first Universal Serial Bus (USB) host and a second USB host for providing unidirectional transmission of data signals from said first USB host to said second USB host, said circuit comprising:
a first circuit configured for electrical connection to said first USB host;
a second circuit configured for electrical connection to said second USB host; and
wherein said first and second circuits are electrically connected to each other in such a manner as to allow the transmission of data signals from the first USB host to the second USB host and prohibit the transmission of data signals from the second USB host to the first USB host.

2. The circuit of claim 1, wherein said first and second circuits are each operable to convert data signals between a USB protocol and a second communications protocol.

3. The circuit of claim 1, wherein said first circuit is operable to receive data signals from said first USB host and convert said data signals from a USB protocol to a second communications protocol, and wherein said second circuit is operable to receive said converted data signals from said first circuit and convert said converted data signals from said second communications protocol to said USB protocol for transmission to said second USB host.

4. The circuit of claim 1, wherein said first USB host is disposed on an election machine and said second USB host is disposed on a computing device.

5. The circuit of claim 1, wherein said first USB host and said first and second circuits are disposed on an election machine so as to provide a unidirectional USB port on said election machine.

6. The circuit of claim 1, wherein said first and second circuits are configured to detachably connect to a USB port of an election machine and a USB port of a computing device, respectively.

7. The circuit of claim 2, wherein said second communications protocol is selected from the following group: RS-232, RS-422, RS-485, I²C, SPI and parallel I/O.

8. The circuit of claim 2, wherein said second communications protocol provides for bidirectional transmission of data signals over at least two physically separated transmission paths.

9. The circuit of claim 3, wherein:
said first circuit includes a first USB interface for electrical connection to said first USB host, said first circuit also including a first serial universal asynchronous receiver/transmitter (UART) interface having a receiver terminal and a transmitter terminal; and
said second circuit includes a second USB interface for electrical connection to said second USB host, said second circuit also including a second serial UART interface having a receiver terminal and a transmitter terminal.

10. The circuit of claim 4, wherein said first and second circuits are operable to transmit a plurality of files from said first USB host of said election machine to said second USB host of said computing device, said files selected from the following group: bootloader files, operating system files, application files, and combinations thereof.

11. The circuit of claim 8, wherein said first and second circuits are configured such that one of said physically separated transmission paths is used for transmission of data signals from said first USB host to said second USB host and the other of said physically separated transmission paths is disabled so as to prevent transmission of data signals from said second USB host to said first USB host.

12. The circuit of claim 9, wherein said transmitter terminal of said first serial UART interface is electrically connected to said receiver terminal of said second serial UART interface so as to provide said transmission path from said first USB host to said second USB host, and wherein said transmitter terminal of said second serial UART interface is not connected to said receiver terminal of said first serial UART interface so as to disable said transmission path from said second USB host to said first USB host.

13. An election machine with a unidirectional Universal Serial Bus (USB) port, said election machine comprising:
a USB host for providing data signals in accordance with a USB protocol;
a first converter circuit electrically connected to said USB host and operable to receive said data signals from said USB host and convert said data signals from said USB protocol to a second communications protocol;
a second converter circuit electrically connected to said first converter circuit and operable to receive said converted data signals from said first converter circuit and convert said converted data signals from said second communications protocol to said USB protocol; and
wherein said first and second converter circuits are electrically connected to each other in such a manner as to allow the transmission of data signals from the first USB host to the second USB host and prohibit the transmission of data signals from the second USB host to the first USB host so as to provide a unidirectional USB port on said election machine.

14. The election machine of claim 13, wherein said second communications protocol is selected from the following group: RS-232, RS-422, RS-485, I²C, SPI and parallel I/O.

15. The election machine of claim 13, wherein said second communications protocol provides for bidirectional transmission of data signals over at least two physically separated transmission paths.

16. The election machine of claim 13, wherein:
said first converter circuit includes a first USB interface electrically connected to said first USB host, said first converter circuit also including a first serial universal asynchronous receiver/transmitter (UART) interface having a receiver terminal and a transmitter terminal; and
said second converter circuit includes a second USB interface for electrical connection to a computing device, said second converter circuit also including a second serial UART interface having a receiver terminal and a transmitter terminal.

17. The election machine of claim 13, wherein a USB port of a computing device is detachably connected to said universal USB port of said election machine.

18. The election machine of claim 15, wherein said first and second converter circuits are configured such that one of said physically separated transmission paths comprises said transmission path from said first converter circuit to said second converter circuit and the other of said physically separated transmission paths comprises said disabled transmission path from said second converter circuit to said first converter circuit.

19. The election machine of claim 16, wherein said transmitter terminal of said first serial UART interface is electrically connected to said receiver terminal of said second serial UART interface so as to provide said transmission path from said first converter circuit to said second converter circuit, and wherein said transmitter terminal of said second serial UART interface is not connected to said receiver terminal of said first serial UART interface so as to disable said transmission path from said second converter circuit to said first converter circuit.

20. The election machine of claim 17, wherein said universal USB port of said election machine is operable to transmit a plurality of files from said election machine to said USB port of said computing device, said files selected from the following group: bootloader files, operating system files, application files, and combinations thereof.

21. The election machine of claim 20, wherein said election machine further comprises an input device operable to receive a download command that initiates said transmission of said files from said election machine to said computing device.

22. The election machine of claim 21, wherein said input device comprises a touch screen display of said election machine.

23. A circuit interfaced between a first Universal Serial Bus (USB) host and a second USB host for providing unidirectional transmission of data signals from said first USB host to said second USB host, said circuit comprising:
a first converter circuit with a first USB interface for electrical connection with said first USB host and a first serial universal asynchronous receiver/transmitter (UART) interface having a receiver terminal and a transmitter terminal;
a second converter circuit with a second USB interface for electrical connection with said second USB host and a second serial UART interface having a receiver terminal and a transmitter terminal; and
wherein said transmitter terminal of said first serial UART interface is electrically connected to said receiver terminal of said second serial UART interface so as to allow the transmission of data signals from said first USB host to said second USB host, and wherein said transmitter terminal of said second serial UART interface is not connected to said receiver terminal of said first serial UART interface so as to prohibit the transmission of data signals from said second USB host to said first USB host.

24. The circuit of claim 23, wherein said first USB host is disposed on an election machine and said second USB host is disposed on a computing device.

25. The circuit of claim 23, wherein said first USB host and said first and second converter circuits are disposed on an election machine so as to provide a unidirectional USB port on said election machine.

26. The circuit of claim 23, wherein said first and second converter circuits are configured to detachably connect to a USB port of an election machine and a USB port of a computing device, respectively.

27. The circuit of claim 24, wherein said first and second converter circuits are operable to transmit a plurality of files from said first USB host of said election machine to said second USB host of said computing device, said files selected from the following group: bootloader files, operating system files, application files, and combinations thereof.

28. A method of securely downloading files from an election machine to a computing device, said method comprising:
providing an election machine with a unidirectional Universal Serial Bus (USB) port;
providing a computing device with a USB port;
connecting said USB port of said computing device to said unidirectional USB port of said election machine; and
inputting a download command into said election machine so as to initiate said download of said files from said election machine to said computing device.

29. The method of claim 28, wherein said unidirectional USB port of said election machine comprises:
a USB host for providing data signals in accordance with a USB protocol;
a first converter circuit electrically connected to said USB host and operable to receive said data signals from said USB host and convert said data signals from said USB protocol to a second communications protocol;
a second converter circuit electrically connected to said first converter circuit and operable to receive said converted data signals from said first converter circuit and convert said converted data signals from said second communications protocol to said USB protocol; and
wherein said first and second converter circuits are electrically connected to each other in such a manner as to provide a transmission path from said first converter circuit to said second converter circuit and to disable a transmission path from said second converter circuit to said first converter circuit.

30. The method of claim 28, wherein said files are selected from the following group: bootloader files, operating system files, application files, and combinations thereof.

31. The method of claim 28, wherein said election machine includes an input device for receiving said download command.

32. The method of claim 29, wherein said second communications protocol is selected from the following group: RS-232, RS-422, RS-485, I²C, SPI and parallel I/O.

33. The method of claim 29, wherein:
said first converter circuit includes a first USB interface electrically connected to said first USB host, said first converter circuit also including a first serial universal asynchronous receiver/transmitter (UART) interface having a receiver terminal and a transmitter terminal; and said second converter circuit includes a second USB interface for electrical connection to said computing device, said second converter circuit also including a second serial UART interface having a receiver terminal and a transmitter terminal.

34. The method of claim 31, wherein said input device comprises a touch screen display of said election machine.

35. The method of claim 33, wherein said transmitter terminal of said first serial UART interface is electrically connected to said receiver terminal of said second serial UART interface so as to provide said transmission path from said first converter circuit to said second converter circuit, and wherein said transmitter terminal of said second serial UART interface is not connected to said receiver terminal of said first serial UART interface so as to disable said transmission path from said second converter circuit to said first converter circuit.

36. A circuit interfaced between a first Universal Serial Bus (USB) host and a second USB host for providing unidirectional transmission of data signals from said first USB host to said second USB host, said circuit comprising:

first means for receiving data signals from said first USB host and converting said data signals from a USB protocol to a second communications protocol; and second means for receiving said converted data signals from said first means and converting said converted data signals from said second communications protocol to said USB protocol for transmission to said second USB host and for prohibiting the transmission of data signals from said second USB host to said first USB host.

37. The circuit of claim 36, wherein said second communications protocol is selected from the following group: RS-232, RS-422, RS-485, I$^2$C, SPI and parallel I/O.

38. The circuit of claim 36, wherein said second communications protocol provides for bidirectional transmission of data signals over at least two physically separated transmission paths.

39. The circuit of claim 36, wherein said first USB host is disposed on an election machine and said second USB host is disposed on a computing device.

40. The circuit of claim 36, wherein said first USB host and said first and second means are disposed on an election machine so as to provide a unidirectional USB port on said election machine.

41. The circuit of claim 36, wherein said first and second means are configured to detachably connect to a USB port of an election machine and a USB port of a computing device, respectively.

42. The circuit of claim 38, wherein said first and second means are configured such that one of said physically separated transmission paths is used for transmission of data signals from said first USB host to said second USB host and the other of said physically separated transmission paths is disabled so as to prevent transmission of data signals from said second USB host to said first USB host.

43. The circuit of claim 39, wherein said first and second means are operable to transmit a plurality of files from said first USB host of said election machine to said second USB host of said computing device, said files selected from the following group: bootloader files, operating system files, application files, and combinations thereof.

* * * * *